ically applies the first and second signals and slow and fast sawtooth signals to the horizontal and vertical inputs of the oscilloscope with intensity of the oscilloscope spot being controlled from the output of the box gate circuit.

United States Patent [19]
Flaherty et al.

[11] 3,825,820
[45] July 23, 1974

[54] GATE CIRCUIT FOR NON-DESTRUCTIVE TESTING SYSTEMS FOR INDICATING WHEN TEST SIGNALS LIE WITHIN PREDETERMINED LIMITS

[75] Inventors: John J. Flaherty, Elk Grove; Eric J. Strauts, Harwood Heights, both of Ill.

[73] Assignee: Magnaflux Corporation, Chicago, Ill.

[22] Filed: Oct. 31, 1972

[21] Appl. No.: 302,518

[52] U.S. Cl. .................................. 324/37
[51] Int. Cl. .............................. G01r 33/12
[58] Field of Search .......................... 324/37, 40

[56] References Cited
UNITED STATES PATENTS

| | | | |
|---|---|---|---|
| 3,343,079 | 9/1967 | Crouch | 324/37 |
| 3,391,336 | 7/1968 | Hentschel | 324/40 |
| 3,405,354 | 10/1968 | Callan et al. | 324/40 |
| 3,538,433 | 11/1970 | Wood et al. | 324/37 |

Primary Examiner—Robert J. Corcoran
Attorney, Agent, or Firm—Van Metre Lund

[57] ABSTRACT

Box gate circuit is disclosed for non-destructive testing systems such as eddy current testing systems in which first and second signals in phase quadrature relation are developed. The circuit preferably includes first and second adjustable limit circuits and first and second comparator circuits coupled to a gate circuit to develop an output signal only when the amplitude of the first signal is between limits set by the first limit circuit and the amplitude of the second signal is concurrently between limits set by the second limit circuit. Monitoring means are provided preferably including an oscilloscope and a multiplexer arrangement alternately applies the first and second signals and slow and fast sawtooth signals to the horizontal and vertical inputs of the oscilloscope with intensity of the oscilloscope spot being controlled from the output of the box gate circuit.

18 Claims, 11 Drawing Figures

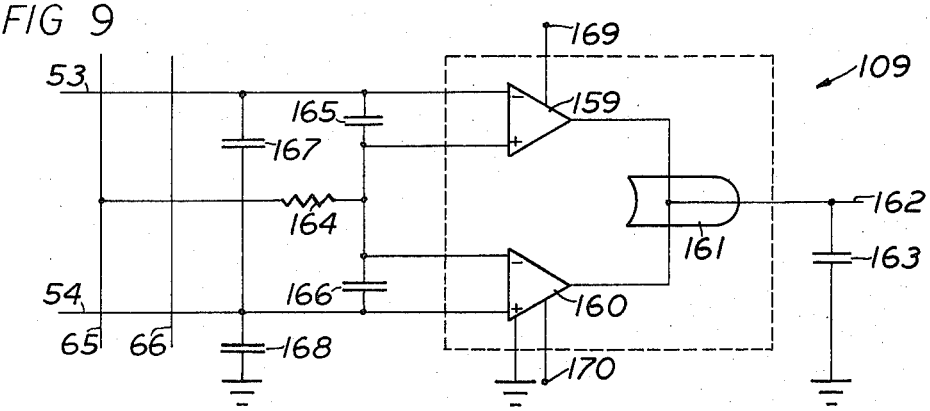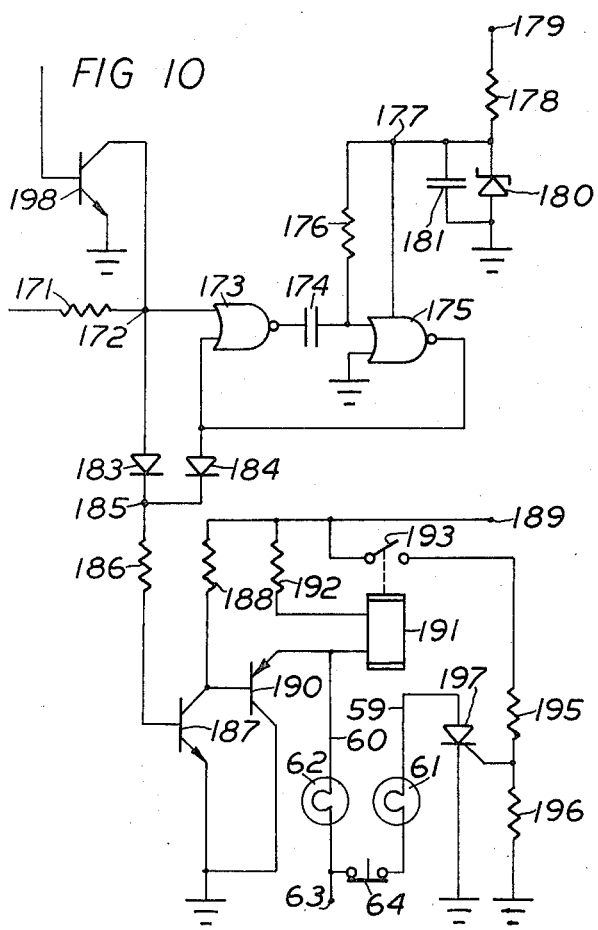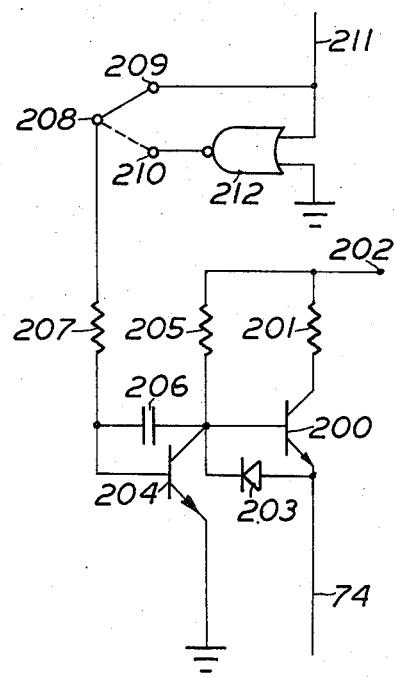

GATE CIRCUIT FOR NON-DESTRUCTIVE TESTING SYSTEMS FOR INDICATING WHEN TEST SIGNALS LIE WITHIN PREDETERMINED LIMITS

This invention relates to a box gate circuit for non-destructive testing systems, and more particularly to a circuit which permits highly accurate and reliable detection of the existence of defects or other characteristics of a part and which is readily adjustable to obtain optimum operation.

The invention is generally applicable to non-destructive testing systems wherein the amplitude of a first signal is between certain limits and the amplitude of a second signal is concurrently within certain limits only in response to a certain part characteristic to be detected. The amplitudes of such first and second signals can be represented by a point on a graph, having "$x$" and "$y$" coordinates respectively corresponding to the amplitudes of the first and second signals, and the range of signal amplitudes corresponding to the part characteristics to be detected being represented by a rectangular area or "box" on the graph, hence the term "box" as used herein. The invention is especially advantageous in eddy current testing systems. For example, the invention may be applied to an eddy current testing system wherein pipe or tubing is passed through an inspection coil unit including an elongated primary coil and a pair of differentially connected secondary coils of short axial length and spaced a short distance apart. The signal produced by the differentially connected secondary coils has a wave shape determined by the characteristics of the part, and by resolving phase quadrature components, a pair of signals are developed from which an indication of a predetermined characteristic of the part can be obtained. For example, cracks or similar defects can be detected independently of variations in other characteristics such as diameter, permeability and the like. It is known in the prior art to apply signals from the phase quadrature components to horizontal and vertical inputs of an oscilloscope to develop an indication in which the distance of deflection of a spot from a center point on the screen is proportional to the magnitude of the test signal from the differentially connected secondary coils and in which the direction of the deflection is at an angle corresponding to the phase. From the resultant indication, it is possible to detect cracks, for example, independently of variations in other characteristics. Various schemes have been proposed for discriminating between types of indications such as gates operable with respect to fixed selectable zones on the screen of the oscilloscope. However, such proposed arrangements have been difficult to apply in practice and not always reliable.

This invention was evolved with the general object of overcoming disadvantages of prior art systems and of providing a system permitting accurate and reliable response to a predetermined part characteristic and which can be readily adjusted according to particular testing requirements.

The invention is based in part upon the observation that the signals developed in eddy current and other non-destructive systems, have a certain relationship of amplitudes from which the existence of one characteristic, such as a crack, can be determined independently of variations in other characteristics. In particular, the operation is oftentimes such that the amplitude of a first signal is between certain limits and the amplitude of a second signal is concurrently between certain limits only in response to a crack in the part and one or the other of the signals will be outside prescribed limits in response to variations in diameter, permeability or other characteristics of the part. In accordance with the invention, box gate means are provided arranged for developing an output signal only when the amplitude of a signal applied to a first input is between a first set of limits and the amplitude of a signal applied to a second input is concurrently between a second set of limits, signals from testing means being applied to the two inputs and an indicating circuit being responsive to the output signal. With this comparatively simple arrangement, it is possible to obtain highly accurate and reliable results.

Important features of the invention relate to the provision of limit adjustment means for setting the first and second sets of limits and monitoring means for indicating the relationship between the amplitudes of the signals and the sets of limits. Preferably, the monitoring means includes oscilloscope means and multiplexer means for alternately applying the first and second signals and slow and fast sawtooth signals to horizontal and vertical inputs of the oscilloscope means with the intensity of the oscilloscope spot being controlled in response to the output of the box gate circuit. With this arrangement, an area is visible on the oscilloscope screen having a position and widths corresponding to the set limits and the area can by readily compared with the signals derived from inspection of the part to permit quick and accurate adjustment of the limits.

Additional important features of the invention relate to circuit interconnections and details for insuring reliable operation and facilitating adjustment.

This invention contemplates other objects, advantages and features which will become more fully apparent from the following detailed description taken in conjunction with the accompanying drawings which illustrate a preferred embodiment and in which:

FIG. 9 is a circuit diagram of a signal comparator shown in block form in FIG. 7;

FIG. 10 is a circuit diagram of an indicating circuit shown in block form in FIG. 7; and FIG. 11 is a circuit diagram of an unblanking circuit shown in block form in FIG. 7.

Figure 1:
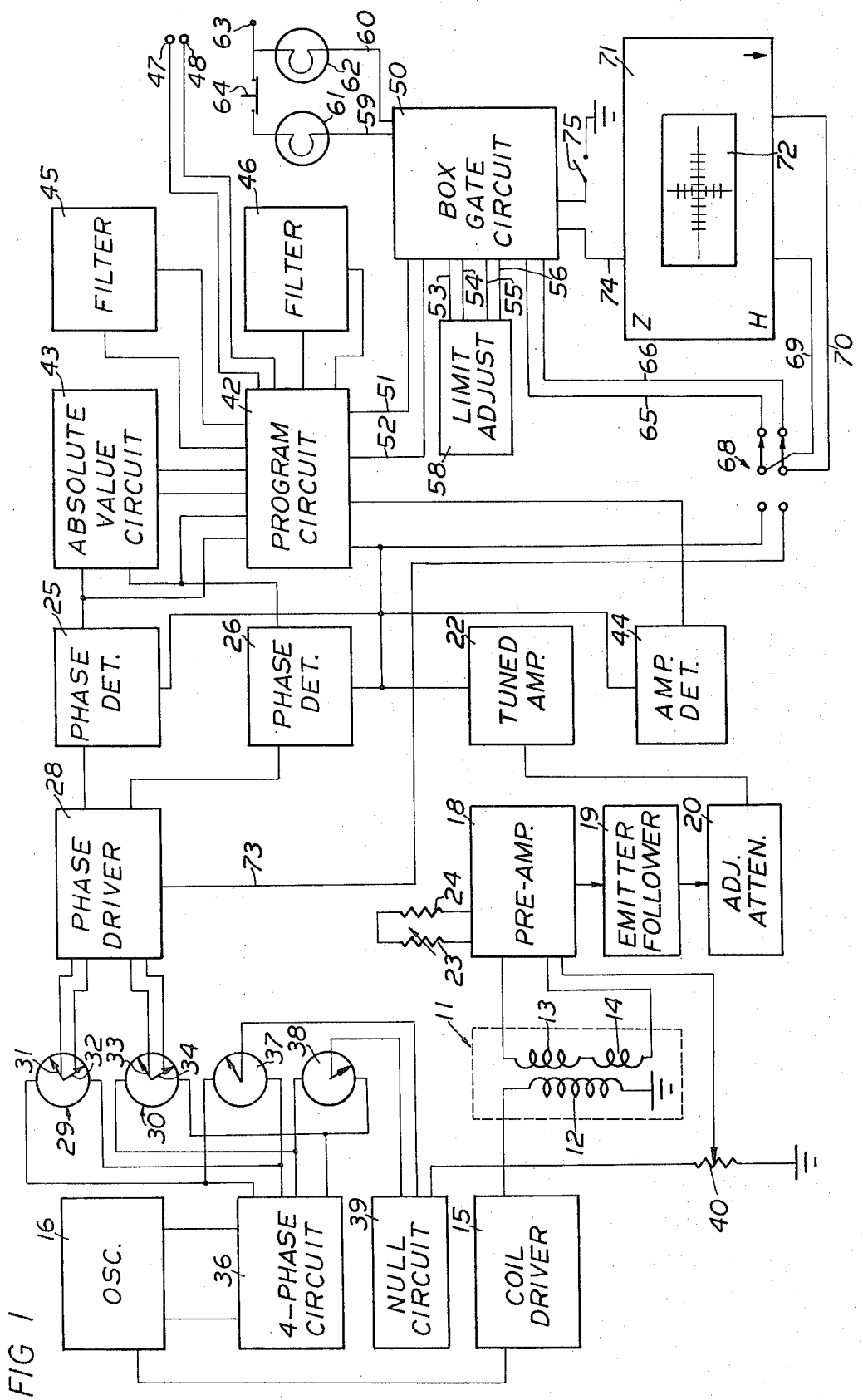
FIG. 1 is a block diagram of an eddy current testing system incorporating box gate circuitry according to the invention.

Reference numeral 10 generally designates an eddy current testing system incorporating box gate circuitry, constructed in accordance with the principles of the invention. The illustrated system includes an inspection coil unit 11 which includes a primary coil 12 and a pair of differentially connected secondary coils 13 and 14. By way of example, the unit 11 may be of a type known in the art in which pipe or tubing to be inspected is passed axially through the coils 11–14. The primary coil 12 may be an axially elongated coil and the secondary coils 13 and 14, located in a central position relative to the elongated primary coil, may be of short axial length and spaced a certain axial distance apart. As the pipe or tubing is passed through the unit 11, a flaw passing under the coil 13 may either increase or decrease the output thereof and then, as it passes under the coil 14, may either increase or decrease the output thereof, the result being that a net output of one phase is produced as the flaw passes under the coil 13 and a net output of the opposite phase is produced as the flaw passes under the coil 14.

The exact phase relation of the signal so obtained is affected by the type of flaw, its configuration and orientation, depth, etc. . Changes in the diameter of the tubing changes in wall thickness, changes in permeability and other variations generally produce different responses with respect to amplitude and phase. In most test operations, it is desirable to be able to discriminate between the responses produced from various causes. For example, it is oftentimes desirable to detect axially extending cracks which might render the tubing unsuitable for its intended use, whereas variations in diameter, wall thickness, permeability and the like, if kept within limits, may be relatively unimportant.

For discrimination between various responses and as hereinafter described, the system 10 includes phase detector circuits, preferably with signals applied thereto being adjustable in phase, and an oscilloscope monitor for producing a flying spot indication. The box gate circuitry of the invention operates in conjunction with the phase detector circuits and the oscilloscope monitor to permit the system to be readily adjusted and to obtain accurate and reliable discrimination between responses produced from various causes.

To excite the inspection coil unit 11, the primary coil 12 is connected to the output of a coil driver stage 15 having an input connected to an oscillator 16 which may be a fixed frequency oscillator or an oscillator having a frequency which is variable, or adjustable in steps, over a range of frequencies. The differentially connected secondary coils 13 and 14 are connected to a pre-amplifier 18 having an output coupled through an emitter follower stage 19 and an adjustable attenuator 20 to a tuned amplifier 22. The attenuator 20, which may be adjustable in steps, forms a "coarse" sensitivity control and an adjustable resistor 23 connected in series with a fixed resistor 24 to the pre-amplifier 18 forms a "fine" sensitivity control.

The output of the tuned amplifier 22 is supplied to a pair of phase detectors 25 and 26 having inputs connected to a phase driver circuit 28. The phase driver circuit 28 has inputs connected to ganged sine and cosine potentiometers 29 and 30, one pair of inputs being connected to movable contacts 31 and 32 of one potentiometer 29 and another pair of inputs being connected to movable contacts 33 and 34 of potentiometer 30. In-phase and 90° phase signals are applied from the oscillator 16 to a four phase circuit 36 which supplies signals in 0° and 180° phase relation to the sine potentiometer 29 and signals in 90° and 270° phase relationship to the cosine potentiometer 30. In operation, signals applied to the phase detectors 25 and 26 are in quadrature phase relationship at all times and of uniform amplitude but the ganged potentiometers 29 and 30 may be rotated to adjust the phase of such signals to obtain any desired phase relationship to the exciting signal applied from oscillator 16 through the driver stage 15 to the primary coil 12. The phase detectors 25 and 26 produce signals proportional to the quadrature components of the signal produced from the differentially connected secondary coils 13 and 14 and applied to the phase detectors through the circuits 18–20 and 22.

Differences in the characteristics in the secondary coils 13 and 14 are difficult to avoid in practice and for compensating for such differences a sine potentiometer 37 is connected to the 0 and 180° outputs of the circuit 36 and a cosine potentiometer 38 is connected to the 90° and 270° outputs of the circuit 36, contacts of the potentiometers 37 and 38 being connected through a null circuit 39 to a potentiometer 40 having a movable contact connected to the pre-amplifier 18. By adjustment of the potentiometers 37, 38 and 40 to obtain a null output when the portions of the part under the coils 13 and 14 have the same characteristics, a substantially exact balance can be obtained.

A programming circuit 42 is provided for making connections for various modes of operation. Programming circuit 42 is connected to outputs of the phase detectors 25 and 26, to an absolute value circuit 43 having inputs connected to the phase detectors 25 and 26, to an amplitude detector circuit 44 having an input connected to the output of tuned amplifier 22, to a pair of filter circuits 45 and 46 and to a pair of terminals 47 and 48 for connection to chart recorders. The circuits 43–46 are used to obtain improved results under various conditions of operation, but are not by themselves of importance to the invention and are therefore not illustrated in detail. It may be noted, however, that the absolute value circuit 43 may be used to increase the sharpness of response to defects passing through the inspection coil unit 11 and may operate in effect as a full wave rectifier such that the responses to passing of a defect through the coils 13 and 14 are of the same polarity and if the coils 13 and 14 have the proper spacing, the result is similar to the effect obtained by a full wave rectification of one cycle of a sine wave, a sharp or abrupt change being produced at the 180° point at which the polarity reverses.

In accordance with the invention, a box gate circuit 50 is provided which is connected through lines 51 and 52 to the programming circuit 42, through lines 53–56 to a limit adjustment circuit 58 and through lines 59 and 60 and lamps 61 and 62 to a power supply terminal 63, a pushbutton switch 64 being connected in series with lamp 61. In one mode of operation, the programming circuit 42 is operable to connect lines 51 and 52 to the outputs of the phase detectors 25 and 26. The box gate circuit 50 is then operable to detect the existence of a signal from the inspection coil 11 which produces a signal on line 51 having an amplitude between certain limits and concurrently a signal on line 52 having an amplitude between certain limits, such limits being adjustable by means of the limit adjustment circuit 58. In response to such a signal, the lamps 61 and 62 are energized, the lamp 61 being held energized until the pushbutton switch 64 is opened. By properly adjusting the limits, through the circuit 58, a high degree of discrimination can be obtained as, for example, between cracks or similar flaws in tubing and dimensional changes, permeability changes and the like.

The box gate circuit 50 is additionally connected through lines 65 and 66 and through a selector switch 68, when positioned in a "dot" position, to lines 69 and 70 which are connected to horizontal and vertical inputs of an oscilloscope 71 having a screen 72. In an opposite "Lissajous" position of the selector switch 68, lines 69 and 70 are connected to the output of amplifier 22 and to a line 73, connected to an output of the phase driver 28, a Lissajous pattern being then produced on the screen 72. Circuit 50 is also connected through line 74 to the "Z" or intensity control input of oscilloscope 71 and also has a connection through a switch 75 to ground.

Figure 2:
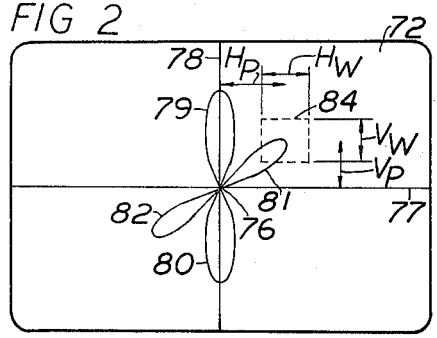
FIGS. 2–6 illustrate patterns produced on the screen of a monitor oscilloscope during various conditions of operation.

Switch 75 when closed is in a "dot" position in which lines 51 and 52 are coupled to the lines 65 and 66 at all times. With lines 51 and 52 being also connected to the outputs of phase detectors 25 and 26 through the programming circuit 42, a pattern may be produced on the screen 72 having a form as shown in FIG. 2. The spot on the screen 72 is deflected away from a center point 76, at the intersection of horizontal and vertical axes 77 and 78, in proportion to the magnitude of the output signal derived from the inspection coil unit 11 and at an angle determined by the position of the potentiometers 29 and 30. When the potentiometers 29 and 30 are in a certain position and when inspecting a particular part such as a length of tubing, for example, changes in the diameter of the tubing may produce deflections generally along the vertical axis 78, as indicated by lobes 79 and 80, while cracks in the tubing may produce deflections at a substantial angle to the vertical axis 78, as well as to the horizontal axis 77, as indicated by lobes 81 and 82. To detect indications from cracks while discriminating against indication from dimensional and other variations, the limit adjustment circuit 58 may be adjusted to respond only to signals which produce movement of the spot within a rectangular area or "box" 84 on the screen 72, as diagrammatically indicated in FIG. 2. Preferably, and as described hereinafter, the limit adjustment circuit 58 may have four controls, a horizontal position control to control a distance $H_p$ from the vertical axis 78 to the center of the box 84, a horizontal width control to control the horizontal width $H_w$ of the box 84, a vertical position control to control a vertical distance $V_p$ from the horizontal axis 77 to the center of the box 84 and a vertical width control to control the vertical width $V_w$ of the box 84.

Figure 3:
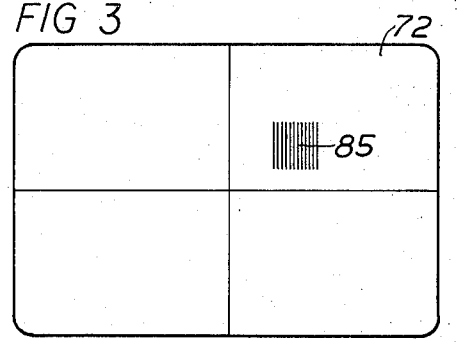
Figure 4:
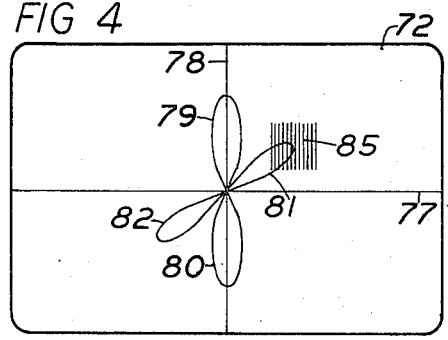

The box 84 is shown diagrammatically in FIG. 2 for purposes of explanation and it will be understood that it is not visible on the screen 72 in the form as shown in FIG. 2. However, a further important feature of the invention is in the provision of means for rendering the area within the box 84 visible on the screen 72, to permit adjustment quickly and with a high degree of accuracy. For this purpose, the switch 75 is moved to an open "dot and box" position in which a pattern is produced periodically as illustrated in FIG. 3, with a brightened area 85 showing the position of the box 84. In the "dot and box" position of switch 75, the pattern of FIG. 3 and the pattern of FIG. 2, consisting of the lobes 79-82, are produced alternately at a rapid rate and due to persistence of vision, the result in the eye of the viewer is a composite pattern as shown in FIG. 4, in which both the brightened box area 85 and the pattern from signals from the inspection coil unit 11 appear. With the composite pattern, the level adjustment circuit 58 can be adjusted to accurately locate the area 85 at the proper position relative to the pattern of the indication. Thereafter, the switch 75 may be placed in the "dot" position which is advantageous in that the information signals are applied at all times to the indicating circuitry.

Figure 5:
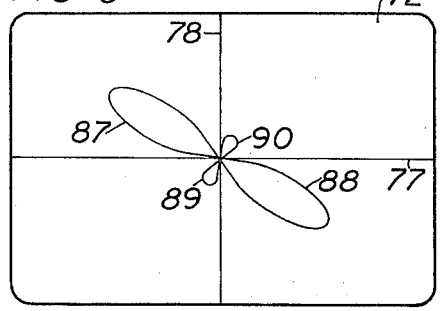
Figure 6:
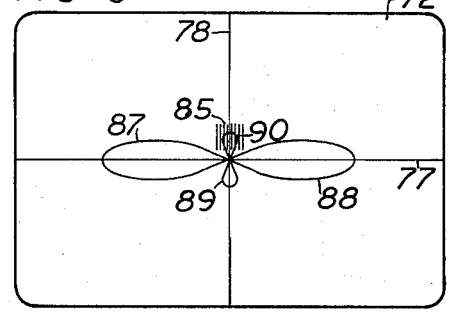

With the invention, responses can be obtained only from signals having certain phase and amplitude relationships which can be precisely determined. In many testing applications, the unwanted signals, i.e., signals from variations which are not of interest in the inspection operation, are of much greater amplitude than the wanted signals i.e., signals from defects or other variations of primary importance. In practice, samples known to have all types of variations to be encountered in practice may be tested to produce patterns on the screen 72 and the position of the box can be accurately adjusted to obtain the proper response. FIG. 5 illustrates a pattern having lobes 87 and 88 from unwanted signals and much smaller lobes 89 and 90 from wanted signals. Preferably, the pattern of FIG. 5 might be rotated by adjustment of the potentiometers 29 and 30, to place the lobes 89 and 90 along one of the axes such as the vertical axis 78, as shown in FIG. 6 and the box indication can be positioned and adjusted to a narrow width to cover only the area of interest. Thus, adjustable phase rotation is highly advantageous in combination with the feature in which the vertical and horizontal widths of the box are adjustable.

It should be noted that the patterns illustrated in FIGS. 2 and 4–6 are generally symmetrical and it might be sufficient to have the box locatable only in the upper right-hand quadrant, especially if the phase can be adjusted. It might also be possible to have the upper limits on the size of the box very high. However, in many cases, the patterns may be unsymmetrical and the area of interest may fall in any one of the four quadrants and at various positions away from the center point. It is therefore highly advantageous to have cnsiderable freedome in adjustment of the position of the box as well as in the adjustment of the horizontal and vertical widths thereof.

Figure 7:
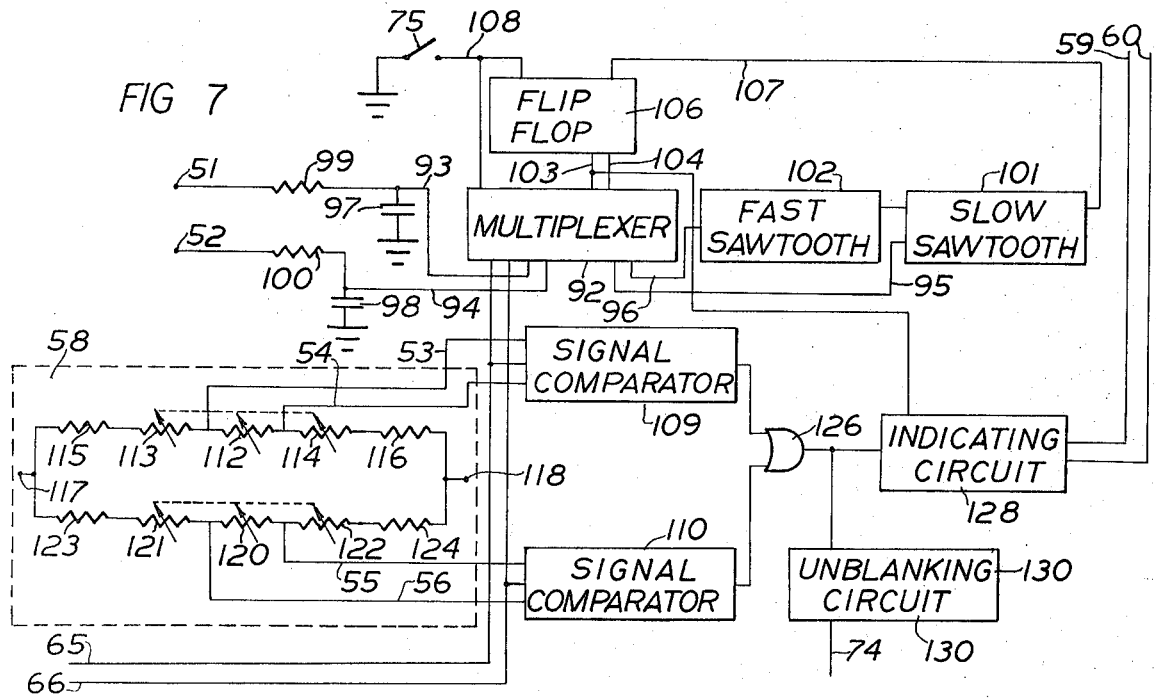
FIG. 7 is a diagram showing box gate circuitry and limit adjustment circuitry of the system shown in FIG. 1.

FIG. 7 is a diagram of the box gate circuit 50 which comprises a multiplexer 92 preferably a commercially available type of integrated circuit operative in effect as a double throw switch to connect lines 65 and 66 either to a pair of lines 93 and 94 or to a pair of lines 95 and 96.

Lines 93 and 94 are connected through capacitors 97 and 98 to ground and through resistors 99 and 100 to lines 51 and 52, capacitors 97 and 98 and resistors 99 and 100 being operative to filter out high frequency transient components of the signals from the phase detectors 25 and 26. Thus in one condition of the multiplexer 92, the lines 51 and 52 are coupled to the lines 65 and 66 which are connectable through the selector switch 68 to the horizontal and vertical inputs of the oscilloscope 71.

Lines 95 and 96 are connected to outputs of a slow sawtooth circuit 101 and a fast sawtooth circuit 102 so that in the other condition of the multiplexer the slow and fast sawtooth signals are applied to the lines 65 and 66 for producing in effect a television type raster on the oscilloscope screen 72. The multiplexer 92 is controlled through lines 103 and 104 from a flip-flop 106 which is connected through line 107 to the slow sawtooth circuit 101, to receive triggering signals therefrom. Flip-flop 106 is also controllable through line 108 from the switch 75. When switch 75 is in the closed "dot" position the flip-flop is placed in a condition to hold the multiplexer in a condition in which lines 65 and 66 are connected to lines 93 and 94. When switch 75 is in its open "dot and box" position, the flip-flop 106 is triggered from the slow sweep circuit 101 to switch the multiplexer 92 into one condition during one operation of the slow sawtooth circuit 101 and to switch the multiplexer 92 into the other condition during the next operation of the slow sawtooth circuit 101.

The box gate circuit 50 further includes a pair of signal comparators 109 and 110 having inputs connected to lines 65 and 66 and having pairs of inputs connected through lines 53-56 to the level adjustment circuit 58. Lines 53 and 54 are connected together and through an adjustable resistor 112 constituting a horizontal width control, and are connected through adjustable resistors 113 and 114 and fixed resistors 115 and 116 to power supply terminals 117 and 118 at fixed positive and negative potentials relative to ground. Adjustable resistors 113 and 114 are ganged together in a manner such that the resistance of one is decreased while the other is increased. Together they constitute a position control. Similarly, lines 55 and 56 are connected together through an adjustable resistor 120, constituting a vertical width control, and ganged adjustable resistors 121 and 122, forming a vertical position control, and fixed resistors 123 and 124 to the power supply terminals 117 and 118.

Each of the signal comparators develops an output signals whenever the signal applied thereto from line 65 or line 66 falls between the voltages applied to the lines 53 and 54 or lines 55 and 56. Normally, the voltage level at the output of each comparator is high, on the order of 3 volts for example, and goes low to approximately ground potential when the input voltage lies between the set limits. The outputs of the comparators 109 and 110 are applied to a NOR gate 126, the output of which goes high when both inputs are low, i.e., when output signals are developed by both comparators 109 and 110.

The output of gate 126 is applied to an indicating circuit 128 having outputs connected through the lines 59 and 60 to the indicator lamps 61 and 62. The lamps 61 and 62 are energized by the indicator circuit 128 at any time that the signal is applied to the comparators 109 and 110 from lines 65 and 66 concurrently fall between the limits set by the adjustment circuit 58, except however, that during the raster or box phase, operation of the indicator circuit 128 is inhibited by a signal applied from output line 103 of flip-flop 106.

The output of gate 126 is additionally applied to the input of an unblanking circuit 130 which is connected through the line 74 to the Z or intensity control input of the oscilloscope 71. The oscilloscope spot, when traversing the area of the screen which corresponds to the limits set by the circuit 58, is intensified to currently indicate the position of the area, especially during the raster phase of operation.

Figure 8:
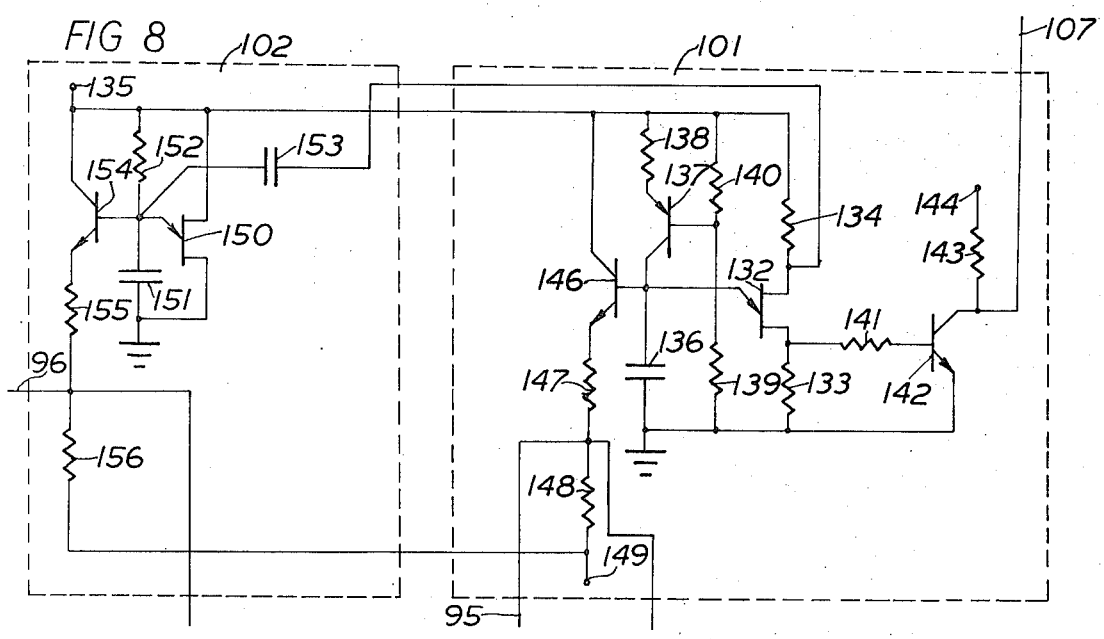
FIG. 8 is a circuit diagram of slow and fast sawtooth circuits shown in block form in FIG. 7.

FIG. 8 shows the slow and fast sawtooth circuits 101 and 102. The slow sawtooth circuit 101 comprises a unijunction transistor 132 having a first base connected through a resistor 133 to ground and having a second base connected through a resistor 134 to a power supply terminal 135. The emitter of the transistor 132 is connected through a capacitor 136 to ground and it is also connected to the collector of a transistor 137 having an emitter connected through a resistor 138 to the power supply terminal 135 and having a base connected through a resistor 139 to ground and through a resistor 140 to the power supply terminal 135. In operation, the capacitor 136 is charged at a substantially linear rate by a substantially constant current supplied by the transistor 137. When the voltage across the capacitor 136 reaches a certain level, the unijunction transistor 132 conducts to discharge the capacitor 136.

A positive pulse is developed across the resistor 133 each time that the unijunction transistor 132 conducts to discharge the capacitor 136 and the pulse is applied through a resistor 141 to the base of a transistor 142 having a grounded emitter and having a collector connected through a resistor 143 to a power supply terminal 144 and also connected to the flip-flop 106 through line 107, to trigger the flip-flop 106 from one state to the other.

The sawtooth voltage developed across the capacitor 136 is applied to the base of a transistor 146 having a collector connected to the power supply terminal 135 and having an emitter connected through resistors 147 and 148 to a power supply terminal 149, preferably at a negative potential relative to ground. The junction between the resistors 147 and 148 is connected through the line 95 to the multiplexer 92.

The fast sawtooth circuit 102 comprises a unijunction transistor 150 having a first base connected to ground and a second base connected to the power supply terminal 135. The emitter of the transistor 150 is connected through a capacitor 151 to ground, through a charging resistor 152 to the power supply terminal 135, through a capacitor 153 to the second base of the transistor 132 to provide a synchronizing coupling between the flip-flops and to the base of a transistor 154. The collector of transistor 154 is connected to the power supply terminal 135 and the emitter thereof is connected through resistors 155 and 156 to the power supply terminal 149, the junction between the resistors 155 and 156 being connected through the line 96 to the multiplexer circuit 92. The fast sawtooth of circuit 102 operates in the manner similar to the slow sawtooth circuit, to develop a sawtooth signal on the line 96.

FIG. 9 illustrates the circuit of the signal comparator 109 which comprises a pair of differential amplifiers 159 and 160 having outputs connected through a gate 161 to an output line 162 which is connected to one input of the gate 126, a capacitor 163 being connected between line 162 and ground. The differential amplifiers 159 and 160 and the gate 161 may preferably be in an integrated circuit package, commercially available. The minus input of the amplifier 159 and the plus input of the amplifier 160 are respectively connected through the ines 53 and 54 to the level adjustment circuit 58 while the plus input of amplifier 159 and the minus input of amplifier 160 are connected together and through a resistor 164 to the line 65. For filtering purposes, capacitors 165 and 166 are connected between the respective input terminals of the amplifiers 159 and 160, a capacitor 167 is connected between the lines 53 and 54 and a capacitor 168 is connected from the line 54 to ground. Power supply terminals 169 and 170 which may respectively be at plus 15 and minus 7 volts relative to ground are connected to the amplifiers 159 and 160.

In operation, if the voltage applied from line 65 through the resistor 164 to the common connection of the plus input of amplifier 159 and the minus input of amplifier 160 is between the voltages applied to lines 53 and 54, the output line 162 is low, at approximately ground potential. However, if the voltage applied from line 65 is above the voltage of line 53 or below the voltage of line 54, the output line 162 is high, at approximately 3 volts, for example.

THe signal comparator circuit 110 is substantially identical to the signal comparator circuit 109.

FIG. 10 illustrates the indicating circuit 128. The input from the output of the gate 126 is applied through a resistor 171 to a circuit point 172 which is connected to one input of a NOR gate 173 the output of which is connected through a capacitor 174 to a circuit point connected to one input of a NOR gate 175 and also through a resistor 176 to a circuit point 177 which is connected through a resistor 178 to a power supply terminal 179 and also through a Zener diode 180 and a parallel capacitor 181 to ground. A seocnd input of the NOR gate 175 is grounded and the output thereof is connected to the input of gate 173. The circuit as thus far described operates as a pulse stretcher, a positive input pulse of short duration being effective to produce a pulse at the output of gate 175 having a long duration, determined primarily by the time constant of the RC circuit formed by resistor 176 and capacitor 174. Circuit point 172 and the output of gate 175 are connected through diodes 183 and 184 to a circuit point 185 connected through a resistor 186 to the base of a transistor 187 having an emitter coupled to ground and having a collector connected through a resistor 188 to a power supply terminal 189 and also to the base of a transistor 190. The collector of transistor 190 is coupled to ground while the emitter thereof is connected through the line 60 and indicator lamp 62 to the power supply terminal 63, the emitter being also connected through a relay 191 and a resistor 192 to the power supply terminal 189. In response to a positive pulse applied to the base of transistor 187, either through the diode 183 or through the diode 184, the transistor 187 is rendered conductive, dropping the collector voltage thereof and rendering the transistor 190 conductive to energize the relay 191, and to also energize the lamp 62. Relay 191, when energized, closes a contact 193 connected to the power supply terminal 189 and also connected through resistors 195 and 196 to ground, the junction between resistors 195 and 196 being connected to the gate of a silicon controlled rectifier 197 having a grounded cathode and having an anode connected through line 59, lamp 61 and pushbutton switch 64 to the power supply terminal 63. When relay contact 193 is closed, the silicon controlled rectifier 197 is triggered into conduction to energize the lamp 61 which is maintained energized until the pushbutton switch 64 is opened. It will be understood that indicating means other than lamps may be employed and automatic marking devices or the like may also be energized from the output of the indicating circuit.

As previously noted, the indicating circuit 128 is rendered inoperative during the raster or box phase of "dot and box" operation. For this purpose, circuit point 172 is connected to the collector of a transistor 198 having a grounded emitter and having a base connected to the line 103 at the output of flip-flop 106.

FIG. 11 illustrates the unblanking circuit 130. Line 74 is connected to the emitter of a transistor 200 the collector of which is connected through a resistor 201 to a power supply terminal 202. Line 74 is also connected through a diode 203 to the collector of a transistor 204 having a grounded emitter. The collector of the transistor 204 is connected to the base of the transistor 200 and also through a resistor 205 to the power supply terminal 202 and through a capacitor 206 to the base of the transistor 204 which is connected through a resistor 207 to a terminal 208 which is connected either to a terminal 209 or to a terminal 210. Terminal 209 is connected to an input line 211 which is connected to the output of the gate 126. Terminal 210 is connected to the output of a NOR gate 212 having one input grounded and a second input connected to the line 211, the gate 212 being operative as an inverter.

In operation, with the terminals 208 and 209 interconnected as shown, the transistor 204 is normally nonconducting and the potential of the collector thereof is high to cause transistor 200 to conduct heavily and to cause the output line 74 to be at a high potential. When the output of the gate 126, applied through line 211 and resistor 207 to the base of the transistor 204, goes high, the transistor 204 conducts heavily causing the transistor 200 to be cut off and causing the output voltage on line 74 to drop, diode 203 being conductive through transistor 204 if required to drive the output line 74 to a lower potential.

Line 74 may be connected in the cathode circuit of the cathode ray tube of the oscilloscope 71 and with the cathode voltage reduced, the spot on the screen 72 is brightened. If desired, the line 74 could be coupled into the grid circuit of the cathode ray tube, in which case the gate 212, operative as an inverter, may be switched into the circuit by disconnecting terminals 208 and 209 and interconnecting terminals 208 and 210.

It is noted that the normal voltage of the output line 74 is normally such that the dot is visible during both the straight dot operation and the dot phase of the dot and box operation, the speed of movement of the dot being relatively slow. During the raster or box phase of the dot and raster operation, however, the dot is moved quite rapidly and is not visible except by operation of the unblanking circuit to indicate the box area of the screen.

It will be understood that modifications and variations may be effected without departing from the spirit and scope of the novel concepts of this invention.

We claim as our invention:

1. In a non-destructive testing system, testing means operative to develop first and second signals in response to the testing of a part with the amplitude of said first signal being between a first pair of lower and upper limits and the amplitude of said second signal being concurrently between a second pair of lower and upper limits only in response to a certain part characteristic to be detected, gate means having first and second inputs and arranged for developing an output signal only when the amplitude of a signal applied to said first input is between a first set of lower and upper limits and the amplitude of a signal applied to said second input is concurrently between a second set of lower and upper limits, said gate means including limit adjustment means for adjusting both of said first set of lower and upper limits and both of said second set of lower and upper limits to respectively correspond to said first and second pairs of lower and upper limits, means for applying said first and second signals from said testing means to said first and second inputs of said gate means, and an indicating circuit responsive to said output signal from said gate means for developing an indicating signal.

2. In a system as defined in claim 1, monitoring means coupled to said testing means and to said limit adjustment means for indicating the amplitudes of said first and second signals in relation to said first and second sets of lower and upper limits.

3. In a system as defined in claim 2, said monitoring means including oscilloscope means including a screen and having horizontal and vertical inputs, and means for applying said first and second signals to said horizontal and vertical inputs of said oscilloscope.

4. In a system as defined in claim 3, said monitoring means further including circuit means coupled to said oscilloscope means for producing on said screen an indication of the boundaries of a rectangular area corresponding to said first and second sets of lower and upper limits, the positions of one pair of opposite boundaries of said area corresponding to said lower and upper limits of said first set and the positions of the other pair of opposite boundaries of said area corresponding to said lower and upper limits of said second set.

5. In a system as defined in claim 4, wherein said oscilloscope includes an intensity control input, said circuit means including intensity control means coupled to said intensity control input for controlling the brightness of said area in relation to the brightness of remaining areas of said screen.

6. In a system as defined in claim 5, said circuit means including slow and fast sawtooth circuit means for developing sawtooth signals at slow and fast rates, and multiplexer means for alternately applying said first and second signals and said slow and fast sawtooth signals to said horizontal and vertical inputs of said oscilloscope means.

7. In a system as defined in claim 6, said intensity control means being responsive to said output signal from said gate means during application of said slow and fast sawtooth signals to said horizontal and vertical inputs of said oscilloscope means.

8. In a system as defined in claim 6, means for disabling said indicating circuit during application of said slow and fast sawtooth signals to said horizontal and vertical inputs of said oscilloscope means.

9. In a system as defined in claim 6, means providing a synchronizing connection between said slow and fast sawtooth circuit means to operate said slow sawtooth circuit means at a rate equal to a sub-multiple of the rate of operation of said fast sawtooth circuit means.

10. In a system as defined in claim 6, flip-flop means for controlling said multiplexer means, and means for applying triggering signals from said slow sawtooth means to said flip-flop means.

11. In a system as defined in claim 6, switch means for selectively placing said multiplexer means in a condition in which only said first and second test signals are applied to said horizontal and vertical inputs of said oscilloscope means.

12. In a system as defined in claim 1, said limit adjustment means comprising a first limit adjustment circuit having a pair of output terminals at different potentials, and a second limit adjustment circuit having a pair of output terminals at different potentials, and said gate means further comprising a first signal comparator responsive to a signal applied to said first input and coupled to said output terminals of said first limit adjustment circuit for developing a first control signal only when the amplitude of said first signal is between the potentials of said output terminals of said first limit circuit, a second signal comparator responsive to a signal applied to said second input and coupled to said output terminals of said second limit adjustment circuit for developing a second control signal only when the amplitude of said second signal is between the potentials of said output terminals of said second limit adjustment circuit, and gate circuits responsive to said first and second control signals and arranged to develop said output signal only in response to concurrence of said first and second control signals from said comparators.

13. In a system as defined in claim 12, each of said limit adjustment circuits comprising a pair of ganged adjustable resistors coupled between said output terminals and positive and negative voltage supply terminals, and a third adjustable resistor connected between said output terminals.

14. In a system as defined in claim 1, said testing means comprising AC supply means, part inspection means coupled to said AC supply means and arranged for developing a test signal having a wave shape corresponding to characteristics of the part, and signal developing means responsive to said test signal for developing said first and second signals.

15. In a system as defined in claim 14, said signal developing means comprising first and second phase detector means coupled to said AC supply means and responsive to said test signal for developing said first and second signals proportion to components of said test signal in phase quadrature relation.

16. In a system as defined in claim 15, adjustable phase rotation means coupled between said AC supply means and said first and second phase detectors.

17. In a system as defined in claim 14, said part inspection means comprising an inspection coil unit including a primary coil coupled to said AC supply means and secondary coil means for developing said test signal.

18. In a system as defined in claim 17, said secondary coil means including a pair of differentially connected secondary coils in spaced relation for inductive association with spaced portions of the part.

* * * * *